United States Patent [19]
Ginther

[11] 3,881,946
[45] May 6, 1975

[54] PLATINUM-FREE GLASS

[75] Inventor: Robert J. Ginther, Temple Hills, Md.

[73] Assignee: The United States of America as represented by the Secretary of the Navy, Washington, D.C.

[22] Filed: May 30, 1973

[21] Appl. No.: 365,320

Related U.S. Application Data

[63] Continuation-in-part of Ser. No. 228,293, Feb. 22, 1972, abandoned.

[52] U.S. Cl. .................................................. 106/52
[51] Int. Cl. ........................... C03c 3/04; C03c 3/30
[58] Field of Search . 106/53; 252/301.4 F, 301.4 R; 331/94.5 E

[56] References Cited
UNITED STATES PATENTS

| | | | |
|---|---|---|---|
| 3,464,880 | 9/1969 | Rinehart | 106/52 |
| 3,471,408 | 10/1969 | Young | 252/301.4 F |
| 3,528,927 | 9/1970 | Grof et al. | 252/301.4 F |
| 3,535,266 | 10/1970 | Lee, Jr. | 252/301.4 F |
| 3,640,093 | 2/1972 | Levene et al. | 106/52 |
| 3,640,890 | 2/1972 | Lee, Jr. et al. | 252/301.4 F |

FOREIGN PATENTS OR APPLICATIONS

| | | | |
|---|---|---|---|
| 1,069,228 | 5/1967 | United Kingdom | 252/301.4 F |

Primary Examiner—Winston A. Douglas
Assistant Examiner—Mark Bell
Attorney, Agent, or Firm—R. S. Sciascia; Arthur L. Branning; Melvin L. Crane

[57] ABSTRACT

Platinum-free glass composition useful in laser systems, the materials used to produce the glass being (1) $SiO_2$, $Al_2O_3$, and (2) mixtures of $Li_2O$, $Na_2O$, MgO and CaO, the concentration of the (2) ingredient being about 18 mole %.

1 Claim, No Drawings

PLATINUM-FREE GLASS

This application is a continuation-in-part of Ser. No. 228,293 filed Feb. 22, 1972 and now abandoned.

BACKGROUND OF THE INVENTION

The invention is related to a composition of glass used as either a laser host material or a passive optical laser component.

In simplified terms, the laser is based on the principle that atoms of certain materials when raised to an excited energy level will emit photons. Such materials are normally placed within a glass or crystal called the "host". The host is said to be "doped" with the photon emitting material and is then capable of lasing. If the host contains undissolved impurities, such as platinum, the glass may become damaged due to the absorption of heat by the impurities.

It is also essential that the glass used in laser systems have a uniform index of refraction in order to limit the propagation of unwanted modes.

Two methods are presently used in the manufacture of laser glass. One method involves melting the raw materials, namely the components of the glass, in a ceramic crucible, such as, mullite or fire clay, in an atmosphere of air. The second method involves melting the components in a platinum or platinum-lined crucible in an inert atmosphere.

The first method, using a ceramic crucible, is subject to serious limitations. The raw materials forming the glass components must be melted at high temperatures. These high temperatures, cause corrosion of the ceramic crucible and the ceramic materials used in silicate glass melting operations are not resistant to this corrosion. Components of the corroded crucible dissolve in the glass. The portion of the glass having these dissolved crucible components will have a refractive index different from the bulk of the glass. Even if the glass is stirred in an attempt to homogenize it, subsequent casting of the glass from the crucible produces inhomogeneous areas in the glass as evidenced by a variation in the refractive indices. Such areas are called striae and are unacceptable for use in a laser.

Another disadvantage of melting the raw materials in a ceramic crucible is that the corrosion may cause small fragments of the crucible to become dislodged. These fragments, forming undissolved impurities in the glass, tend to absorb heat from the laser radiation and cause damage to the glass.

For these reasons it is more advantageous to employ the second method and produce the glass using a platinum crucible. Although platinum is the most corrosion resistant glass melting container known, the use of platinum containers is also subject to disadvantages. Laser glass melted in an atmosphere of air is found to contain inclusions of undissolved metallic platinum. If these inclusions are large enough, they can produce serious damage to the glass during high power operation.

The cause of the inclusions has been explained in several ways. Although never proven it has been theorized that one cause of the inclusions is the abrasion of platinum particles from the crucible and their subsequent dispersion into the glass melt. Another cause is the creation of a solution of the platinum in the glass followed by its precipitation as metallic platinum particles. Still another cause and perhaps major source of platinum inclusion is air oxidation of the platinum crucible followed by a vapor phase transport of a platinum containing compound to the glass. To solve this latter problem it was proposed to eliminate the oxidation by melting the glass in a non-oxidizing atmosphere, such as nitrogen. In practice it was found that this technique reduced, but did not eliminate platinum inclusions. Damage to the glass caused by these platinum inclusions continued to occur and a solution was not apparent to the art. The present invention solves this problem of platinum inclusions.

SUMMARY OF THE INVENTION

This invention relates to glass for use in laser systems. More specifically, it refers to a glass composition and a process for making said composition in which contaminating platinum is eliminated from the glass composition by utilizing only stable oxides in the process.

DETAILED DESCRIPTION

This invention involves the control of platinum contamination in glass by using a concentration of mixed alkali and alkaline earth oxides of not greater than 18 mole percent. It, also, involves the selection of those oxides which are the least volatile and whose vapors suffer little or no dissociation and the addition of a fining agent and lasing agent. The process requires that the components melt at relatively low temperatures of less than 1500°C and preferably about 1400°C. The use of low temperatures is important since the volatility and dissociation of the components are a function of the temperature. Further the process employs the use of a non-oxiding atmosphere to eliminate air oxidation of the crucible.

Oxides suitable for use in this invention are mixtures of two or more of $Li_2O$, $Na_2O$, MgO and CaO. When combined with $Al_2O_3$ and $SiO_2$ such that the molar concentration of the alkali and alkaline earth oxides is about 18%, a glass is formed which is virtually platinum-free. The relative proportions of $SiO_2$ to $Al_2O_3$ is not critical to the production of platinum-free glass. The critical aspect of the production of such platinum-free glass is the use of only the oxides listed above in quantities above 0 molar percent but less than 18 molar percent. The use of other oxides would lead to glass having platinum inclusions. It is expected that any mixture of $Al_2O_3$, $SiO_2$ and a molar concentration below 18% of the above mentioned alkali and alkaline earth oxides will produce platinum-free glass.

The raw materials used to produce the required alkali and alkaline earth oxides are $Li_2CO_3$, $Na_2CO_3$, MgO and $CaCO_3$. However, other alkali and alkaline earth compounds which produce the required oxides can be used. For example, $MgCO_3$, CaO and $Al(OH)_3$ can be used. For example, $MgCO_3$, CaO and $Al(OH)_3$ can be substituted for MgO, $CaCO_3$ and $Al_2O_3$ as raw materials. Synthetic silica, ground quartz and sand are all silica sources.

In the production of optical glass it is often necessary to use a fining agent to eliminate bubbles. Antimony, arsenic, sulfate, or halide ions are commonly used as fining agents. However, in reducing atmosphere melting only halides are suitable. The use of fluoride ion is of great assistance in the elimination of bubbles in the above mentioned glass. A convenient method of incorporating fluoride ion in the melt is to replace the $CaCO_3$ as a raw material with an equimolar quantity of $CaF_2$. In this manner, the glass composition produced contains the fluoride ion as partial replacement for oxygen.

In order to produce a glass capable of lasing, a lasing agent must be added. This lasing agent is usually a rare earth ion such as neodymium, or cerium and neodymium. Other rare earth ions which provide glasses that lase at different wavelengths can be used. Suitable rare earth ions are Yb, Ho, Er, Tm or various combinations of these.

In addition, sensitizer ions can be incorporated in the glass to improve the absorption for exciting radiation.

The glass produced is suitable as an optical glass for use in laser systems. To be used as laser glass, the composition must be doped with rare earth ions such as neodymium, or cerium and neodymium. In the example the raw components were each reduced proportionally and 0.6 mole % rare earth ion was added. In this case 0.10 mole % $Ce_2O_3$ and 0.50 mole % $Nd_2O_3$ was added to the melt.

The glass of Example 1 has been compared with compositions representative of two commercially produced laser glass matrices that are shown below.

| Glass type | $Li_2O$ | $Na_2O$ | $K_2O$ | CaO | BaO | $Al_2O_3$ | $SiO_2$ |
|---|---|---|---|---|---|---|---|
| Aluminosilicate | 27.7 | | | 10.0 | | 2.5 | 59.8 |
| Barium Crown | 2.5 | 7.5 | 7.6 | | 2.6 | 1.2 | 78.6 |

Suitable sensitizers are Mn and Cr.

The glass composition is produced by dry blending the raw components, then melting the components in a platinum crucible at a temperature below 1500°C. Resistance heated furnaces or induction heaters are suitable heating means. The atmosphere surrounding the crucible is non-oxidizing. Either a neutral or a reducing atmosphere can be used. For example, 100% CO, 100% $CO_2$, or various mixtures of CO—$CO_2$ can be employed as the atmosphere.

In order to more fully explain this invention the following example is set forth.

EXAMPLE 1

The following raw components were dry blended and then melted in a platinum crucible at 1400°C in an atmosphere of 90% CO—10% $CO_2$ in an induction furnace while employing the platinum crucible as a susceptor.

| | | |
|---|---|---|
| $Li_2CO_3$ | 1.0g | 0.014 moles |
| $Na_2CO_3$ | 4.6g | 0.043 moles |
| MgO | 0.2g | 0.01 moles |
| $CaCO_3$ | 1.0g | 0.01 moles |
| $Al_2O_3$ | 1.4g | 0.014 moles |
| $SiO_2$ | 20.0g | 0.333 moles |

The components produced a glass of the following molar composition.

| $Li_2O$ | $Na_2O$ | MgO | CaO | $Al_2O_3$ | $SiO_2$ |
|---|---|---|---|---|---|
| 3.4 | 10.3 | 1.2 | 2.3 | 3.2 | 79.6 |

Platinum only in a concentration of 0.02 micrograms per square inch can be detected on the top surface, while none can be detected in the bulk of the glass.

In order to eliminate bubbles in the glass the $CaCO_3$ was replaced by an equimolar concentration of $CaF_2$.

When the raw materials used to produce the above glasses were melted in a platinum crucible in a non-oxidizing atmosphere, the top surface revealed a platinum concentration of 1–25 micrograms per square inch, while the bulk contained a platinum concentration of 20 parts per billion. The comparison shows that the concentration of platinum found in the commercially produced compositions is significantly greater than that found in the composition presently disclosed.

It is believed that platinum contamination in the commercial aluminosilicate glass is caused by the high molar concentration of alkali and alkaline earth oxides, 61%. The cause of the platinum contamination found in Barium Crown glass appears to be the use of oxides which are highly unstable and dissociate easily. $K_2O$, in particular, appears to be a serious offender.

Compositions which have solely an alkali oxide to silica molar ratio of about 1 to 5 have been experimented with also. However, these compositions do not produce clear glass when melted at temperatures below 1500°C. Melting above 1500°C produces platinum inclusions.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A glass composition consisting of the following ingredients in approximate molar percentages:

| Ingredients | Mole Percent |
|---|---|
| $SiO_2$ | 79.6 |
| $Al_2O_3$ | 3.2 |
| $Li_2O$ | 3.4 |
| $Na_2O$ | 10.3 |
| MgO | 1.2 |
| CaO | 2.3. |

* * * * *